June 7, 1932.  D. W. DAVIS  1,861,789

ELECTROLYTE CONTROL UNIT

Filed Feb. 4, 1929

INVENTOR,
Dean W. Davis,
By Minturn & Minturn
Attorneys.

Patented June 7, 1932

1,861,789

UNITED STATES PATENT OFFICE

DEAN W. DAVIS, OF PENDLETON, INDIANA, ASSIGNOR, BY MESNE ASSIGNMENTS, TO THOMAS M. HARDY, OF PENDLETON, INDIANA, AND GUSTAV A. SCHNULL, OF INDIANAPOLIS, INDIANA

ELECTROLYTE CONTROL UNIT

Application filed February 4, 1929. Serial No. 337,233.

This invention relates generally to means for maintaining a constant level of the electrolyte in a secondary cell or current rectifier, and in particular to means for combining the gases arising from the electrolyte, permitting the escape of gases from the cell or rectifier when not in the proper proportions to be combined, and returning the resultant product of the combined gases to the cell or rectifier.

The invention is herein described in the one particular form as illustrated in the accompanying drawing, in which—

Figure 1:
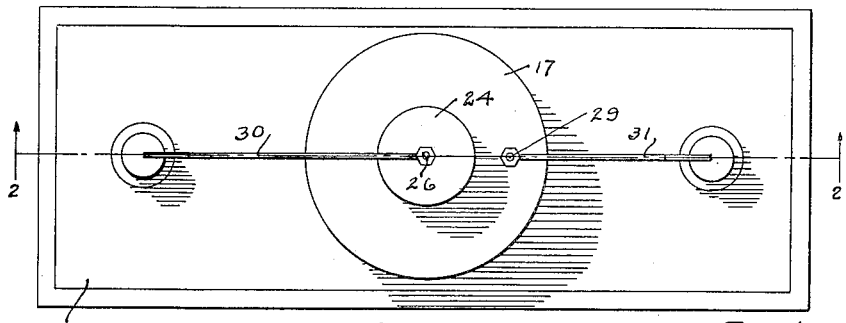
Figure 2:
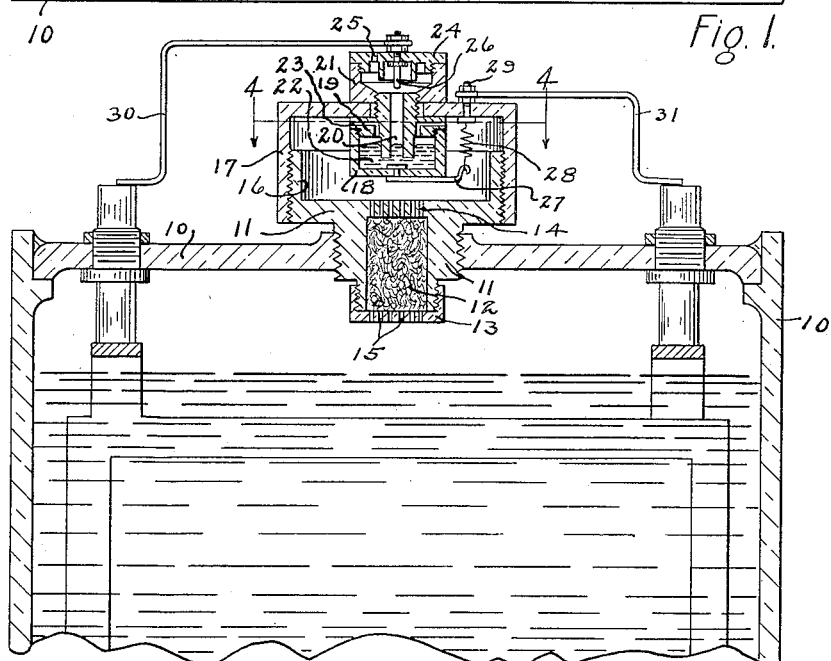
Figures 3, 4:
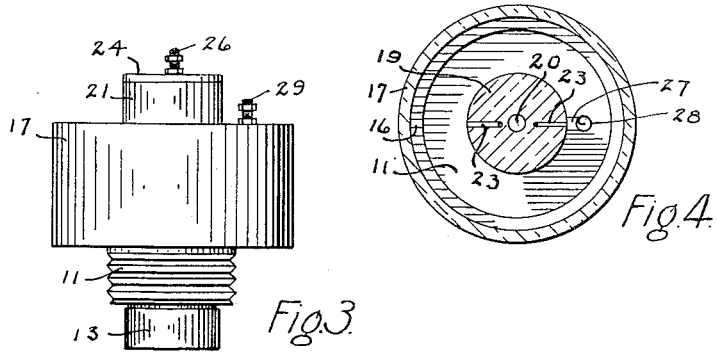

Fig. 1 is a top plan view of a cell embodying my invention;

Fig. 2, a vertical section on the line 2—2 in Fig. 1;

Fig. 3, a side elevation of the control unit; and

Fig. 4, a transverse section on the line 4—4 in Fig. 2.

Like characters of reference indicate like parts throughout the several views in the drawing.

Into the usual vent of the cell 10 is screwed a base 11 which has a central receptacle therein filled with an acid-resisting material 12 of a nature to have a plurality of small interstices, preferably spun glass. A cap 13 screw-threadedly fits on the bottom of the base 11 to retain the material in the receptacle. A plurality of holes 14 permit communication from the top side of the base to within the receptacle, and likewise, a plurality of holes 15 are provided in the cap 13 so that gases evolved in the cell 10 may pass through the cap, the material 12, and the holes 14 to above the base 11 and yet the electrolyte in the cell is prevented from splashing or spraying through to the top side of the base.

The base 11 is provided with an upturned flange 16 around which a cover 17 screw-threadedly engages to define a gas holder enclosure therebetween of a small volume.

A receptacle 18 screw-threadedly engages a cover 19 which has a tube 20 extending down to within the receptacle 18 and an upward extension of the tube which passes freely through the top of the cover 17 and screw-threadedly engaged in the overflow cup 21 to compressively engage the cover top 17 therebetween. The receptacle 18 contains a small amount of a fluid 22, preferably mercury, which is a conductor of electricity to have the lower end of the tube 20 submerged in the liquid, Fig. 2. The cover 19 has a plurality of passageways 23, here shown as two in number which provides free communication between the enclosure between the cover 17 and the base 11 and the space within the receptacle 18 above the fluid 22 so that an increase in pressure without the receptacle will tend to force the liquid 22 to ascend the tube 20.

Into the top of the cup 21 is screw-threadedly inserted the cap 24 and a vent hole 25 is provided through the cap. An electrode 26 is fixed in the cap 24 to extend downwardly toward the top end of the tube 20, and a conductor 27 having a terminal extending to within the receptacle 18 to be contacted by the fluid 22 projects from the under side of the receptacle and holds one end of a short length of platinum wire 28, the other end of which is connected to the terminal 29 which extends from the cover 17. A wire 30 leads from the outer terminal of the electrode 26 to one terminal post of the cell, while the wire 31 leads from the terminal 29 to the other cell terminal.

When in operation, the control unit functions as follows. Gases evolving from the electrolyte pass freely upwardly through the material 12 to within the enclosure between the base 11 and the cover 17. As such gases accumulate within this enclosure their pressure tends to raise above the atmospheric pressure and any increase in pressure is at once communicated through the passages 23 to the top surface of the fluid 22 whereupon there is a corresponding elevation of the fluid 22 within the tube 20, the surface of the fluid within the tube 20 being subjected to atmospheric pressure by reason of the vent hole 25 thereabove.

Now as the pressure increases for example to around three-eighths of a pound above atmospheric pressure, which pressure will not have any detrimental effect upon the seal or plates of the cell, the fluid 22 will be raised until it actually contacts the electrode 26 whereupon a circuit is closed between the cell and the platinum wire 28 so that the wire 28 is heated sufficiently to cause a combination of the gases then present in the enclosure under the cover 17 should the gases be present in the proper mixture. Such gases are hydrogen and oxygen usually initially mixed with the atmospheric air. Should there be a mixture of such gases present that will not be combined by the presence of the heated platinum wire, then the continued evolution of gases from the cell will tend to further increase the pressure on the surface of the fluid in the receptacle 18 up to a point where the fluid will be driven into the overflow cup 21 and a portion of the gases will travel up the tube 20 bubble through the fluid and escape through the vent 25 whereupon the fluid will drop back down the tube 20 to a level dependent upon the pressure of gases remaining in the enclosure without the receptacle 18, the fluid being continuously if not intermittently in contact between the electrode 26 and the inner end of the conductor 27 so that the wire 28 remains heated to cause the gases to combine when the correct proportions are reached, until the pressure drops in the enclosure.

As a matter of fact, since the wire 28 is beyond the spray or splash of the electrolyte and is kept dry, it continues to glow and serve as a catalyst in causing the hydrogen and oxygen to combine after the current has ceased to flow through it.

The product of the union of the gases is water, which drops to the floor of the enclosure on the top of the base 11. The pressure arising in the enclosure drives the water back down through the material 12 to the cell to replenish that which has previously been decomposed into gases and thereby maintain a constant level in the cell.

The material 12 is compressible and non-inflammable and serves not only as a means to prevent acid from the cell reaching the wire 28 and the surface of the fluid 22 and a flame cap entering the cell, but also serves the important function of preventing a sudden change of pressure in the cell resulting from the combination of the gases in the enclosure above while at the same time it permits a gradual change of pressure to a point of equalization between the cell and the enclosure above, with the water being forced back down through the material.

I claim:

1. In an electrolyte container level control, a cover having a down-turned flange, a base having an upturned flange cooperating with the flange of the cover to form a gas holder, said base having a receptacle therein filled with a material like spun glass, said base having restricted inlets and having restricted discharges into the gas holder, a container in the gas holder supplied with a conducting liquid and having a gas space above the liquid communicating with the interior of the gas holder, a cover screw-threadedly engaging the container, an overflow cup on top of the gas holder cover, a tube screw-threadedly engaging the container cover and cup and compressively engaging the gas holder cover therebetween, said tube having its end submerged in the liquid in the container, said cup having a vent to atmosphere, an electrode projecting into the cup to be contacted by the liquid when the liquid is raised by gas pressure, a conductor having a terminal in constant contact with the conducting liquid in the container and a gas ignition means within the gas holder in electric circuit with the last conductor.

2. In an electrolyte container lever control, a gas holder having a hollow externally threaded base extension with connecting holes between the holder and extension, a gas holder cover, a cap removably secured to the bottom of the base extension said cap having a plurality of holes therethrough, a filling of spun glass in the base extension, a container in the gas holder having communicating openings into the gas holder, a cover fastened to the container, mercury in the container, an overflow cup on top of the gas holder cover, a tube screw-threadedly engaging the cup and container cover and compressively engaging the gas holder cover therebetween, said tube having its end submerged in the mercury, the top of said cup having an opening to atmosphere, an electrode projecting into the cup to be contacted by the mercury when the mercury is sufficiently raised by gas pressure, a conductor having a terminal in constant contact with the mercury and a gas ignition means within the gas holder in electric circuit with the last conductor.

In testimony whereof I affix my signature.

DEAN W. DAVIS.